UNITED STATES PATENT OFFICE.

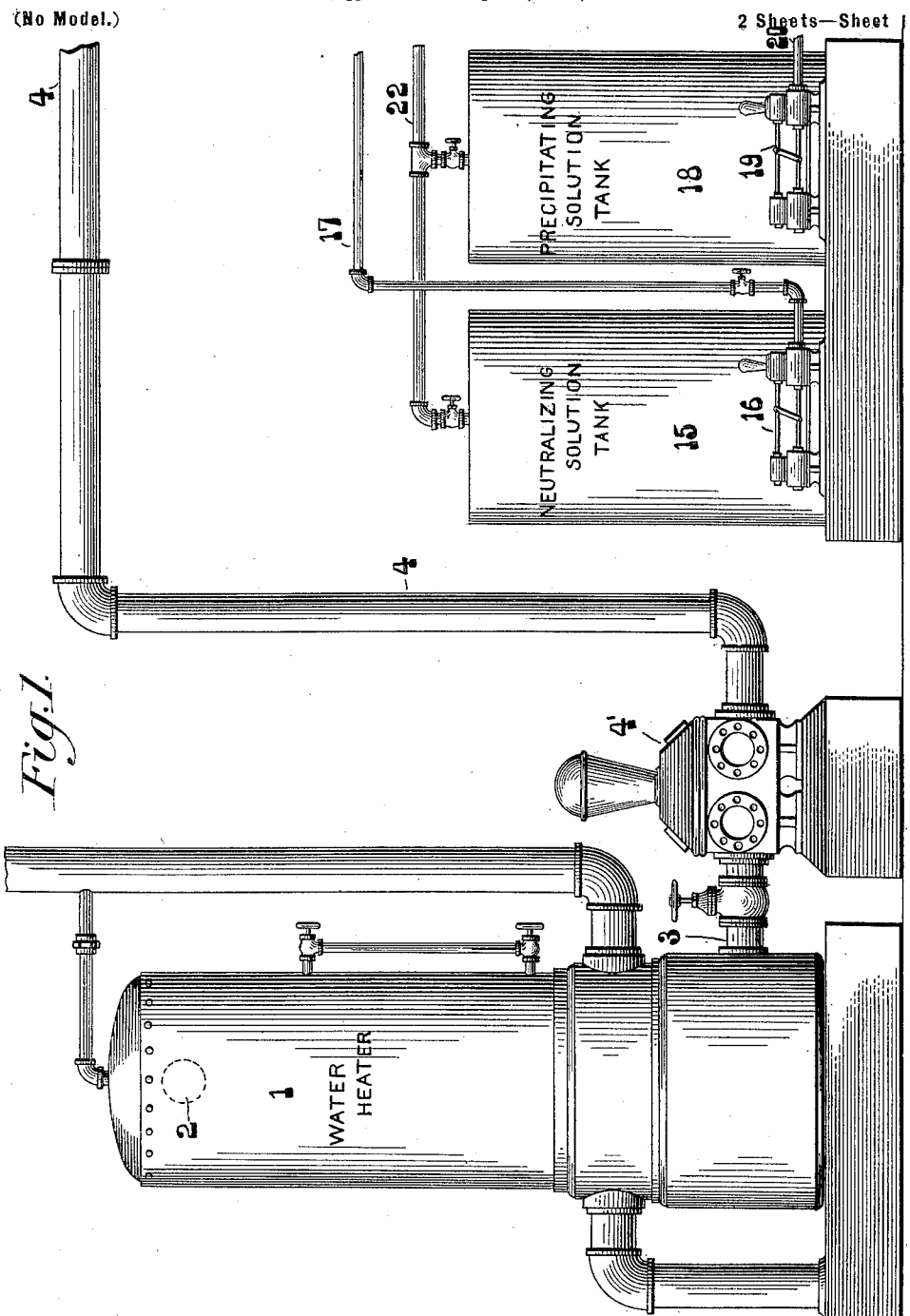

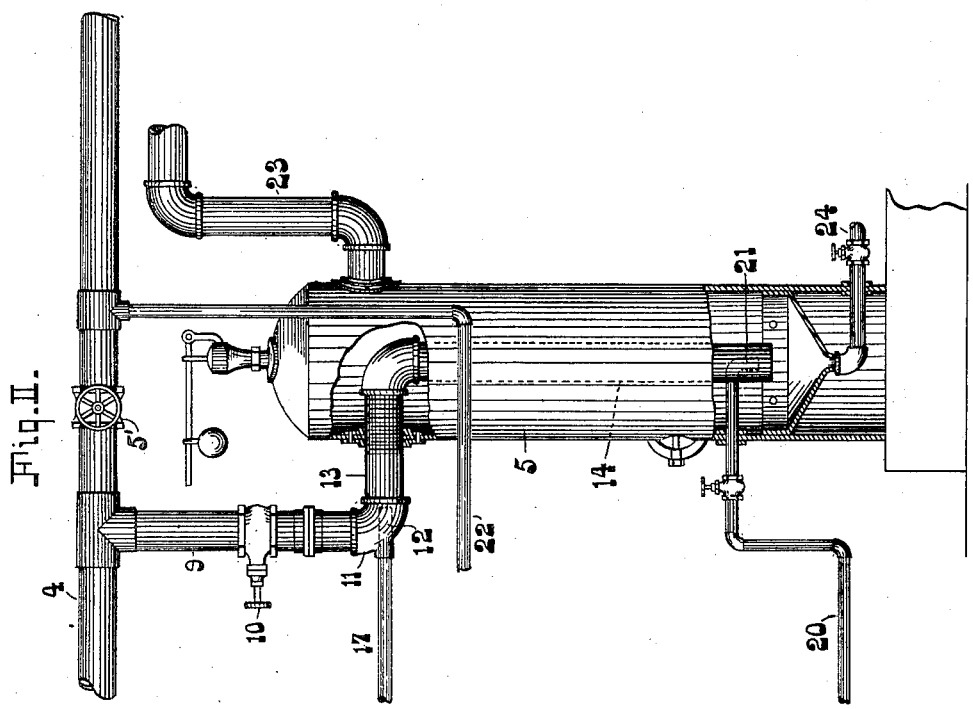

WILLIAM C. CLARKE, OF PITTSBURG, PENNSYLVANIA, ASSIGNOR TO JAMES V. SCAIFE, OF PITTSBURG, PENNSYLVANIA.

APPARATUS FOR PURIFYING WATER.

SPECIFICATION forming part of Letters Patent No. 699,655, dated May 13, 1902.

Application filed September 16, 1901. Serial No. 75,435. (No model.)

*To all whom it may concern:*

Be it known that I, WILLIAM C. CLARKE, a citizen of the United States, residing at Pittsburg, in the county of Allegheny and State of Pennsylvania, have invented or discovered new and useful Improvements in Apparatus for Purifying Water, of which the following is a specification.

The accompanying two sheets of drawings represent in continuation a side elevation of my improved apparatus for purifying water and showing the shell of the precipitating-tank partly broken away and in section, Figure I representing the water-heater and the solution-tanks with their connections, and Fig. II representing the precipitating-tank with its connections.

The objects of my invention, generally stated, are, first, to provide suitable means for the thorough diffusion of a neutralizing solution in water and before the water is discharged into the precipitating-tank; second, the discharge of the precipitating solution into the water after the water has been neutralized and before it is discharged into the precipitating-tank.

Another object of my invention is the discharge of the water containing both the neutralizing and precipitating solutions into the lower portion of the precipitating-tank, whereby substantially such matter as is affected by the precipitating solution remains at the bottom, while such matter as is affected by the neutralizing solution is held in suspension and passes up and out of the precipitating-tank with the water.

In the drawings, 1 represents a water-heater having inlet-pipe 2, outlet-pipe 3, and the usual fixtures necessary to water-heaters.

4' represents a force-pump connecting the water-heater's discharge-pipe 3 and the general supply-pipe 4.

5' is a valve in pipe 4.

9 is a branch pipe from pipe 4, having valve 10 and L 11 secured thereto.

12 is a nozzle. (Shown in dotted lines.)

13 and 14 are continuations of pipe 9.

15 represents a neutralizing-solution tank.

16 is a force-pump connected to the outlet-pipe of said tank and the discharge-pipe 17. Said pipe 17 is connected to the nozzle 12.

18 represents a precipitating-solution tank having pump 19 connected to its discharge-pipe. Pipe 20 is connected to pump 19 and passes through the side of the precipitating-tank 5 and also through the side of pipe 14 and terminates in the nozzle 21.

22 is a supply-pipe leading from the main supply-pipe 4 to the neutralizing-solution and the precipitating-solution tanks 15 and 18. Pipe 23 connects the precipitating-tank's water-discharge and the filter inlet-pipes. Pipe 24 carries off the sediment from the bottom of the precipitating-tank 5.

In the operation of my invention water heated to a suitable temperature, whereby the best results can be obtained by the neutralizing and precipitating solutions, is forced by pump 4' from water-heater 1 through pipe 4. Valve 5' being closed and valve 10 open the water passes from pipe 4 through pipe 9 and its continuations 13 and 14 and discharges near the bottom of the precipitating-tank 5. The neutralizing solution contained in tank 15 flows to pump 16 and is forced by said pump through pipe 17 and nozzle 12, discharging into the water in pipe 13 and passing down pipe 14. The neutralizing solution in passing down pipe 14 has sufficient time in which to be thoroughly diffused through the water before it is discharged into the precipitating-tank 5. The precipitating solution contained in tank 18 flows to pump 19 and is forced by said pump through pipe 20 and out of nozzle 21, discharging into pipe 14, and is diffused through the water in said pipe, thereby causing a precipitation of such matter as is affected by the precipitating solution. During the upward passage of the water through the precipitating-tank 5 it has sufficient time to permit the final separation and precipitation of such matter as may be contained in the water and was not separated nor precipitated before leaving the pipe 14. The neutralized water passes from the precipitating-tank 5 by means of pipe 23, which may lead to a filter or to any suitable receptacle.

Having described my invention, I claim—

1. In a water-purifying apparatus a precipitating-tank, a supply-pipe, its exit being near the bottom of the tank, a pipe connected to said main pipe whereby a neutralizing solution is discharged thereinto, and a pipe entering said tank and said main pipe inside the tank, whereby a precipitating solution is discharged thereinto.

2. In a water-purifying plant, a precipitating-tank, a main supply-pipe leading thereinto and having its exit near the bottom thereof, a pipe discharging neutralizing solution into the main pipe, and a second pipe entering the main supply-pipe near its exit in the tank for discharging a precipitating solution thereinto.

3. In a water-purifying plant, a precipitating-tank, a main supply-pipe having its exit near the bottom of the tank, pipes for discharging neutralizing and precipitating solutions into the main pipe, one of the solution-discharging pipes having its exit near the bottom of the main pipe.

4. In a water-purifying plant, a precipitating-tank, a main supply-pipe having its exit near the bottom of the tank, pipes for discharging neutralizing and precipitating solutions into the main pipe, one of the solution-discharging pipes having its exit near the bottom of the main pipe, the said tank having its outlet near its top.

Signed at Pittsburg this 9th day of September, 1901.

WILLIAM C. CLARKE.

Witnesses:
GEO. H. HARVEY,
G. W. LERCH.